April 18, 1944.   R. J. WOODS   2,346,809
AIRPLANE CONSTRUCTION
Filed Sept. 20, 1940
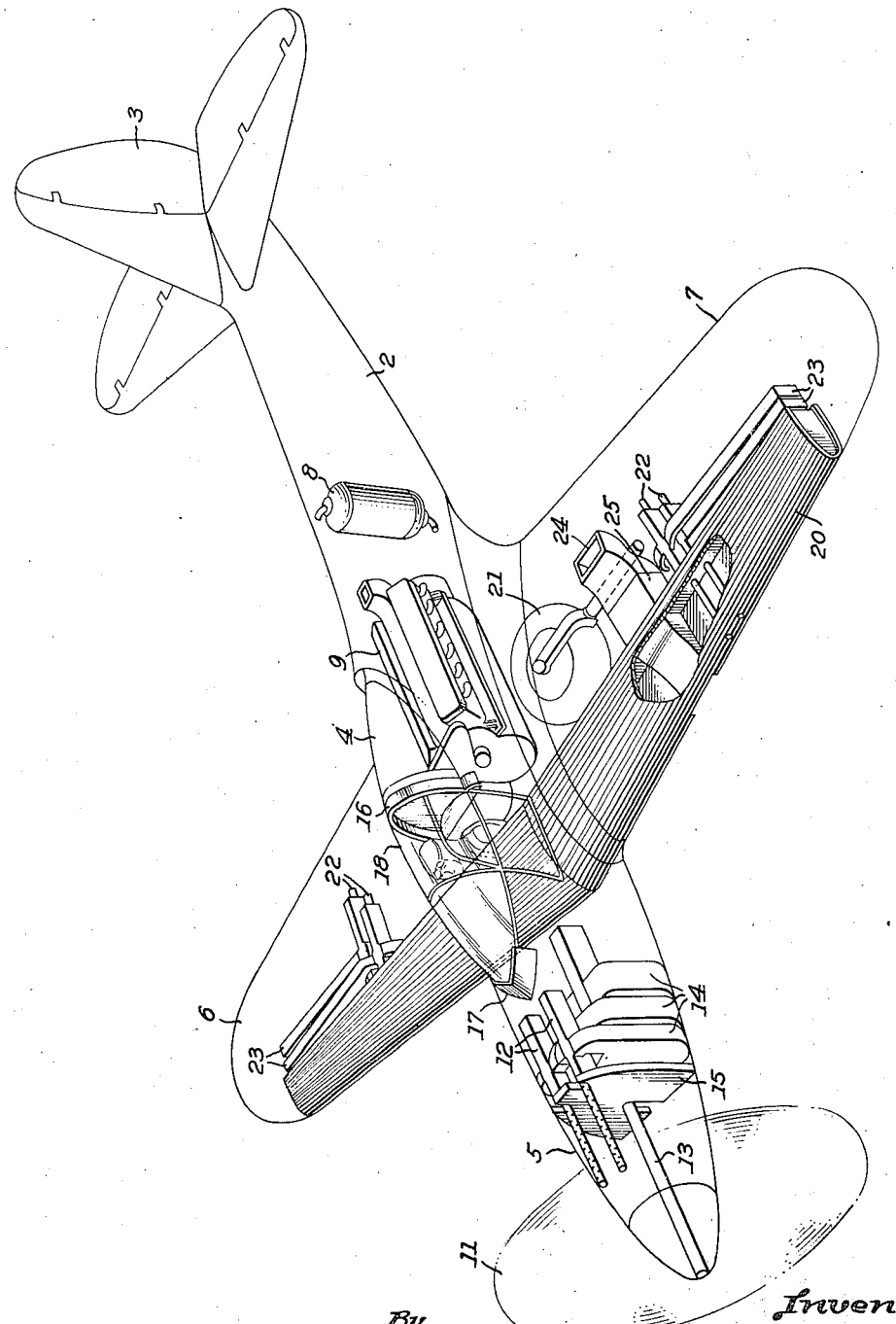
Inventor:
ROBERT J. WOODS
By
Semmes, Keegin, Beale & Semmes
Attorneys.

Patented Apr. 18, 1944

2,346,809

UNITED STATES PATENT OFFICE 2,346,809

AIRPLANE CONSTRUCTION

Robert J. Woods, Grand Island, N. Y., assignor to Bell Aircraft Corporation, Buffalo, N. Y., a corporation of New York Application September 20, 1940, Serial No. 357,659

1 Claim. (Cl. 244—117)

This invention relates to airplane construction, and more especially to a construction in which the members of the basic structure of the airplane are composed of armor metal.

One of the objects of this invention is to provide an airplane, the vital parts of which are protected by armor without increasing unnecessarily the weight of the machine.

A further object of my invention is to provide an airplane, the vital parts of which are protected by members of the basic structure of the airplane which are composed of armor plate.

With these and other objects in view, this invention embraces broadly the concept of constructing of armor plate the basic structural members of airplanes. This enables the basic parts to perform the double function of protecting the vital parts of the airplane and of serving in their ordinary capacity as structural members. By "basic structure" is meant the members which compose the skeleton of the airplane, such as wing beams and bulkheads.

In the preferred form of the invention, only the basic structural members which cover the vital parts of the airplane are composed of armor plate so as not to unnecessarily increase the weight of the airplane. The members selected in the specific instances will, of course, vary in accordance with the position of the vital parts to be protected in the particular airplane.

In the drawing the single figure discloses a side elevational view of an airplane partly in section disclosing the invention.

For purposes of illustration the invention is shown in the drawing adapted for use in connection with a high speed monoplane, generally indicated by the numeral 1. This airplane 1 comprises a fuselage 2 provided with an empennage 3, cockpit 4, prolonged nose portion 5, and wings having high speed characteristics 6 and 7.

Mounted in the fuselage 2 is a leak-proof oil tank 8 connected to a motive power unit 9 which is operatively connected through an extension shaft to a propeller of the tractor type 11 mounted on the nose 5 of the fuselage 2.

A pair of machine guns 12 are also mounted in the nose 5 of the fuselage 2 together with a 35 mm. cannon 13, the muzzle of which is coaxial with the hub of the propeller 11. The machine guns 12 and the cannon 13 are provided with ammunition supply boxes 14.

The basic structure of the fuselage 2 includes a bulkhead 15 which is positioned directly in front of the guns 12 and 13 and is slotted to enable the muzzles of these guns to pass through the bulkhead. This bulkhead 15 is made of armor plate and protects the guns 12 and 13, ammunition boxes 14 and pilot in the cockpit 4 from enemy fire.

A second bulkhead 16 at the rear of the cockpit 4 is also composed of armor plate and together with the engine 9 protects the pilot from fire from the rear.

The front part of the cockpit 4 is provided with a shield 17 of armor plate which further protects the cockpit controls and pilot. The space between the shield 17 and bulkhead 16 is enclosed with bullet-proof glass 18.

The wings 6 and 7 are supported by a main box beam structure 20 of conventional design which serves as a fuel reservoir and is connected to the engine 9 by suitable connecting means not shown. This beam 20 is constructed of armor plate and therefore serves as a further protection to the pilot and engine 9.

Each of the wings is also provided with a recess into which may be retracted the landing wheels 21 which include the customary tires, brakes and retracting mechanism. Also positioned in each of the wings is a pair of machine guns 22 equipped with barrels extending through the box beam 20, the muzzles of which protrude through the leading edge of the wing. The guns are provided with ammunition boxes 23.

Each wing is also provided with an air slot 24 provided with an inlet aperture positioned adjacent the leading edge of the wing and an outlet aperture on the upper surface of the wing aft of the wing beam. Intermediate of these openings in each slot 24 is mounted an air cooled radiator 25 which is operatively connected to the engine 9. The wing is also provided with the usual ailerons and flaps which are not shown.

The above described construction and positioning of the vital parts of the airplane enable the box beam 20 to serve as a shield not only to the wing gun installations and boxes, slot construction, radiator and radiator connections, but also protects the remainder of the basic wing structure including the ailerons and flaps from gunfire.

It is believed obvious from the above discussion that the described construction will produce an airplane in which all of the armor installed has been so distributed as to form a major component of the aircraft structure as well as to provide protection for the vital installations of the airplane.

While for purposes of illustration an airplane has been shown in which the basic structural parts selected to be made of armor plate were the wing beam and some of the fuselage bulkheads, it is obvious that other basic structural parts, such as the remaining fuselage bulkheads or wing bulkheads, could be made of steel of armor grade without departing from the scope of the invention. For this reason, it is to be understood that the invention disclosed in this application is to be limited only by the prior art and the scope of the appended claim.

I claim:

An airplane, the vital parts of which are protected by armor metal without decrease in maneuverability comprising a fuselage, a pair of bulkheads supporting the fuselage, a centrally located cockpit positioned intermediate the bulkheads, an apron attached to the fuselage and extending upwardly in front of the cockpit, a main airfoil, a wing beam of box construction extending substantially the length of the airfoil and passing through the fuselage beneath the cockpit, and a power unit positioned behind the cockpit and in line with the wing beam, said bulkheads, apron and wing beam being composed of armor metal.

ROBERT J. WOODS.